United States Patent [19]

Handal et al.

[11] 4,455,925

[45] Jun. 26, 1984

[54] BAKING SHEET

[76] Inventors: Anthony H. Handal; Thaddea B. Handal, both of 10 Tudor La., Scarsdale, N.Y. 10583

[21] Appl. No.: 366,578

[22] Filed: Apr. 8, 1982

[51] Int. Cl.³ ............................................. A47J 37/00
[52] U.S. Cl. ..................................... 99/422; 126/39 M
[58] Field of Search ................. 99/422, 449, 423, 450, 99/425; 126/9 A, 41 R, 39 M; 108/90; 229/3.5 M F

[56] References Cited

U.S. PATENT DOCUMENTS

| | | | |
|---|---|---|---|
| 2,040,996 | 5/1936 | Hungerford | 99/422 |
| 2,803,242 | 8/1957 | Hammond | 99/425 X |
| 2,849,949 | 9/1958 | Trachtman | 99/425 |
| 2,939,606 | 6/1960 | Durbin | 126/39 M |
| 3,141,590 | 7/1964 | Anderson | 126/39 M X |
| 3,536,000 | 10/1970 | Whitehill | 99/425 |
| 3,555,994 | 1/1971 | Nemetz | 126/39 M X |

*Primary Examiner*—Billy J. Wilhite
*Attorney, Agent, or Firm*—Anthony H. Handal

[57] ABSTRACT

A baking sheet is disclosed which is particularly useful for baking relatively thin confections, such as cookies. Means are provided for preventing the browning or charring of edge portions of the cookie during baking by reducing the transfer of heat to these edge portions.

5 Claims, 4 Drawing Figures

BAKING SHEET

TECHNICAL FIELD

The invention relates to a baking sheet particularly useful for baking relatively thin confections, such as cookies, divinity fudge and the like. The sheet includes a replaceable member and exhibits characteristics which promote uniform baking. Uniform baking is achieved by reducing conduction of heat to peripheral areas of an item to be baked such as a cookie, as compared to the action of conventional cookie sheets.

BACKGROUND ART

One of the most common problems encountered in the cooking of baked goods in an ordinary gas fueled or electrically powered oven is uneven heating, resulting in parts of the baked items being more cooked than other parts of the item. For example, in the case of cookies, the periphery of the cookie is often charred or browned, while the rest of the cookie is properly cooked.

In an attempt to provide a remedy for this problem, a number of partially effective solutions may be proposed. For example, the lumps of dough which melt to form the cookies may be placed closer together on the baking sheet, thereby causing them to melt into each other and form one large mass. In such a manner, the majority of the peripheral area of the cookies is eliminated and the resulting large planar cookie may then be cut to form individual cookies. However, the periphery of this large cookie will still suffer from the same problems and is thus likely to be overcooked. In addition, because of the large size of the central area of the larger cookie, prolonged baking may be required and the browing on the periphery of the larger cookie may be thus severe in magnitude and cover a wider area of the periphery.

As an alternative, the baker may choose to remove the cookies from the oven before the edges become too severely burned. However, this results in a compromise of the cooking time for the center of the cookie and, may result in a doughy, undercooked and unacceptable cookie center.

Applicant has determined the above problems to be the result of an interaction of heat insulative, heat conductive, and evaporative phenomena. In particular, during the course of cooking, the lump of dough rests on top of a cookie sheet having a thickness typically on the order of 0.035 inches. The cookie is subjected to the hot air in the oven both directly on the top of the cookie and through the pan on the bottom of the cookie. Because of the thinness of the cookie sheet, heat conduction to the bottom is excellent. Simultaneously, the cookie is subjected to cooling due to the evaporation of moisture and other vaporizable materials in the raw dough. In addition, the portion of the cookie sheet between the cookies absorbs heat from the hot air in the oven. Because the portion of the cookie sheet underneath the cookies is relatively cool due to the evaporation of moisture from the cookie, a temperature gradient exists between that portion of the cookie sheet underneath the cookie and the remaining portions of the cookie sheet. Accordingly, there is a resultant heat flow from the exposed portions of the cookie sheet to the portions underneath the cookie. These exposed portions thus act as heat collectors.

The first portion of those portions of the cookie sheet underneath the cookie to receive the heat collected by the exposed portion of the cookie sheet is that area which immediately underlies the periphery of the cookie. The periphery of the cookie is, in turn, relatively cool due to evaporation. The heat is thus conducted to the cookie from this peripheral portion of the cookie sheet, heating the peripheral portion of the cookie, causing more evaporation of moisture from the peripheral portion of the cookie resulting in cooling of the peripheral portion of the cookie sheet underlying the peripheral portion of the cookie and, accordingly, the conduction of more heat to the peripheral portion of the cookie sheet.

During the course of cooking, the moisture content of the periphery of the cookie is thus reduced dramatically as compared to the moisture content of the central portion of the cookie. As cooking progresses further, almost all moisture is depleted from the periphery of the cookie and the application of heat to the periphery of the cookie, both from its underside and its topside, results only in oxidation of the ingredients and resultant charring or browning of the periphery.

DISCLOSURE OF INVENTION

The invention as claimed provides a solution to the problem of baking cookies in a conventional household oven without overcooking the outer periphery of the cookie. The inventive device is simple and economical in use. It has the advantage of a replaceable cooking member, thus making washing unnecessary.

The advantages offered by the invention are mainly that the structure reduces the transfer of heat to the periphery of the cookie, as compared to a conventional cookie sheet. In such a manner, the overcooking of the periphery is prevented as cooking progresses evenly throughout all portions of the cookie.

BRIEF DESCRIPTION OF THE DRAWINGS

One way of carrying out the invention is described in detail below with reference to the drawings which illustrate one specific embodiment, in which.

DETAILED DESCRIPTION OF THE PREFERRED EMBODIMENT

Figure 1:
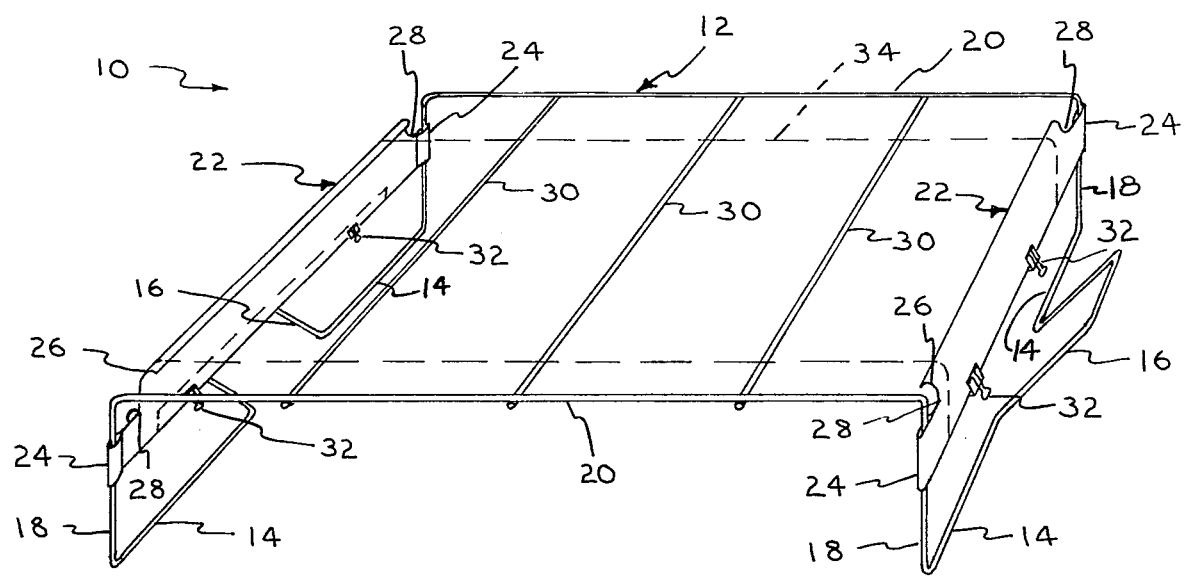
FIG. 1 is a perspective view of a device in accordance with the invention.

A baking or cookie sheet 10 constructed in accordance with the present invention is illustrated in FIG. 1. This device includes a main frame 12. The main frame 12 includes four base portions 14 and a pair of handle portions 16 which may be integral with base portions 14. Main frame 12 also includes four riser portions 18 which may also be made integral with the remaining portions of the main frame. Finally, main frame 12 includes a pair of horizontal support members 20. Main frame 12 and, thus its component parts 14-20 may be made from a single length of metal bar stock formed as shown in FIG. 1. In the alternative, it may be more desirable to form main frame 12 from a plurality of members suitably bent and/or welded together.

Figure 2:
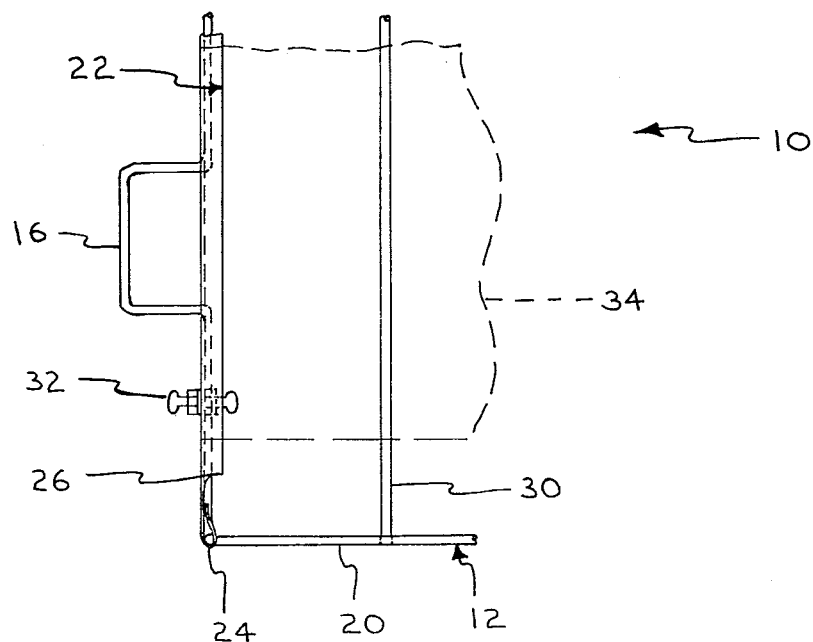
FIG. 2 is a top view of the device illustrated in FIG. 1.

A pair of baking surface support members 22 are secured to main frame 12 as shown in FIG. 1. Support member 22 is made of a planar material formed as shown in FIG. 1 to include four curved gripping portions 24 which extend around riser portions 18. In accordance with the preferred embodiment, these baking surface support members 22 are welded to the main frame 12. Support members 22 also include a curved support surface 26 (FIG. 2). A portion of the baking support member 22 is cut away in the area between support surface 26 and gripping portions 24 as indicated at 28 in FIG. 1.

The support structure also includes a plurality of crossbars 30 which are secured to the underside of horizontal support members 20. While these crossbars are not a necessary feature for operation of the device, they make its use more convenient and reliable. The space between the crossbars 30 and the support surfaces 26 may vary greatly but may range typically on the order of about 1.5 inches.

All of the above-described parts of the inventive baking sheet may be made of any suitable material, such as steel plated with chrome or any other suitable protective material, such as Teflon, or if a high quality product having a long life is desired, all of these parts may be made of stainless steel.

The inventive structure also includes four clamps 32 which may be clamps of any suitable type. Such clamps may be, for example, a screw operated stainless steel clamp, or a clamp of the type used in offices to secure papers to each other, as is illustrated. Four clamps have been found sufficient to give the desired result, although additional clamps will give additional stability to the structure and may be required dependent upon the size of the rack and the nature of the baking being done. In particular, the weight of the goods being baked may be the determinative factor in selecting the density of crossbars 30 and the number of clamps 32. Typically, support members 22 are made of sheet metal having a thickness of 0.035 inches, thus giving the clamps a relatively thick surface to engage. This promotes positive engagement by the clamps.

Figure 4:
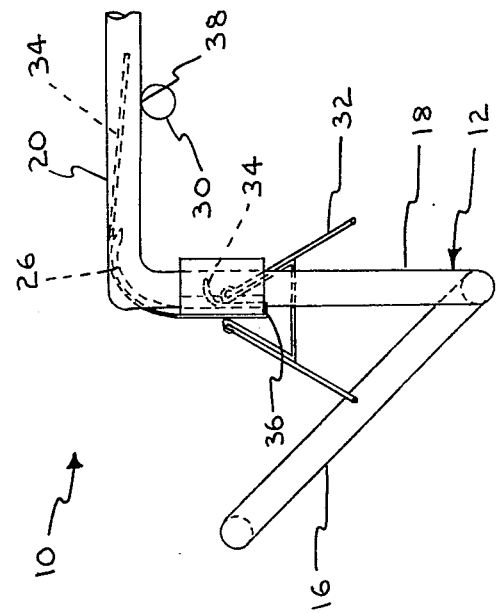
FIG. 4 is a side elevational view of the device illustrated in FIG. 3.
Figure 3:
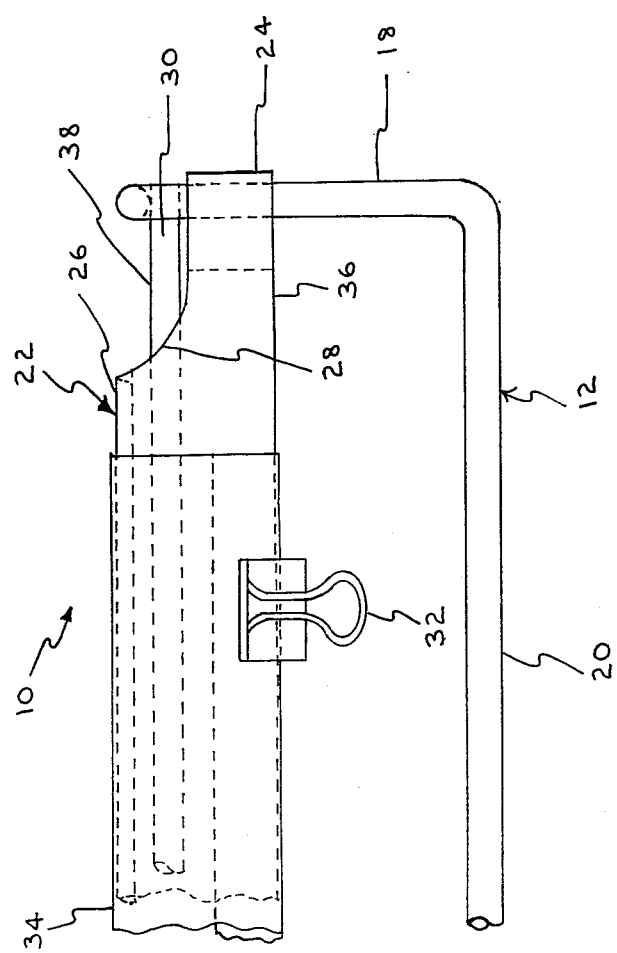
FIG. 3 is a front elevational view of the inventive device.

When it is desired to use the inventive baking sheet, a sheet of ordinary household aluminum foil 34 is disposed over the rack as shown in phantom lines in FIGS. 1 and 2. Referring in particular to FIGS. 3 and 4, sheet 34 is disposed around the bottom edge 36 of baking surface support member 22 (FIG. 4). Sheet 34 then proceeds around curved support surface 26 toward the other end of the rack to opposite curved support surface 26 (FIG. 3) and then around the bottom edge 36 of the other baking surface support member 22 (FIG. 3). The aluminum foil sheet 34 is secured in this position by clamps 32. It is noted that the tops 38 of crossbars 30 are lower than the support surface 26 of support members 22 (FIG. 4). This is done in order that should the aluminum sheet 34 begin to sag as shown in phantom lines in FIG. 4, the direction of the slope of the sheet 34 will be determined and will result in the flow of any cookie dough toward the center of the cookie sheet as opposed to the edges and over the side of the baking sheet.

After the sheet has thus been mounted on the inventive rack, cookies are deposited on the aluminum sheet in the conventional manner and put in the oven for cooking. As noted above, the essence of the problem of peripheral cookie burning is the conduction of heat from the exposed portions of the cookie sheet to the periphery of the cookie sheet. While the aluminum foil which forms sheet 34 does have the same collection surface as a conventional cookie sheet, its thinness, typically on the order of 0.001 inches gives it relatively low thermal conductivity in the planar direction. Thus the planar flow of heat to the periphery of the cookie sheet is impeded and the above-described peripheral burning effect is substantially eliminated. While an illustrative embodiment of the invention has been described, it is, of course, understood that various modifications will be obvious to those of ordinary skill in the art, for example, aluminum foil could be replaced by another sheet having low conductivity, regardless of the material of that member. Such changes and modifications are within the scope of the invention which is limited and defined only by the appended claims.

We claim:

1. A baking utensil, comprising frame means, said frame means including a pair of transverse support members having top surfaces positioned, configured and dimensioned to support a bendable planar baking surface disposed between said transverse support members, and support means for supporting said planar baking surface, with a plurality of confections disposed on said surface, wherein said support means is discontinuous and comprises clamp means and a plurality of secondary support members disposed between said transverse support members having top surfaces slightly lower than the top surfaces of said transverse support members.

2. A baking utensil as in claim 1, further comprising longitudinal support members secured to the end of said transverse support members a level above said discontinuous support means.

3. A baking sheet utensil as in claim 1 or 2, further comprising a sheet of aluminum foil disposed between said transverse support members and maintained in place by said support means.

4. A baking utensil, comprising frame means, said frame means including a pair of transverse support members having top surfaces positioned, configured and dimensioned to support a bendable planar baking surface disposed between said transverse support members, and support means for supporting said planar baking surface with a plurality of confections disposed on said surface, each of said pair of transverse support members comprising a planar member having a rounded support surface and said frame means including riser means secured to the ends of said transverse support members, said transverse support members including a cutaway portion extending between transverse support members and said riser means, wherein said support means comprises clamp means and said transverse support members present a thickness to said clamp means of at least ten-thousandths of an inch.

5. A baking utensil as in claim 4 further comprising handle means secured to said frame means.

* * * * *